May 5, 1970 A. P. DE VITO 3,510,831

SOLDER WELL TERMINAL WITH FINE WIRE RETAINING PRONGS

Filed April 17, 1968

INVENTOR.

Albert P. DeVito

BY Hill, Sherman, Meroni, Gross & Simpson ATTORNEYS

United States Patent Office 3,510,831

Patented May 5, 1970

3,510,831
SOLDER WELL TERMINAL WITH FINE WIRE RETAINING PRONGS

Albert P. De Vito, Niles, Ill., assignor, by mesne assignments, to Conalco Metals, Inc., a corporation of Delaware Filed Apr. 17, 1968, Ser. No. 722,054
Int. Cl. H01r 11/06, 11/22
U.S. Cl. 339—258 12 Claims

ABSTRACT OF THE DISCLOSURE

An electrical solder well terminal has a tubular body with an opening into one end receptive of an electrical wire thrust thereinto endwise. A set of elongated wire-retaining prongs on the body converge over and away from the opening and have wire-gripping tip portions yieldably interdigitated about a wire-receiving vertex. These prongs are extensive along the sides of wire-retaining fingers which extend therebeyond.

This invention relates to improvements in electrical terminals of the solder lug or well type, and is more particularly concerned with providing such terminals with means that will effect a more positive retention of electrical lead wires, especially fine wires inserted thereinto preparatory to dip soldering.

Prior electrical terminals of the solder well type have been provided with wire-gripping fingers, and have been reasonably successful in retaining larger gauges of electrical lead wires or bundles of lead wires. Often, however, individual small gauge wires must be assembled with the terminals. Practical experience with prior solder well terminals has been a lack of satisfactory retention of the smaller wires so that they tend to become very easily dislodged or even drop out of the terminals in handling incident to various assembly and soldering operations. This apparently comes about because these solder well terminals are made from sheet metal as progressive die stamped and shaped articles in which the retaining fingers are subject to the usual variables and tolerances which must be expected in any stamped sheet metal product. The forming dies necessarily have various tolerances and are subject to wear. Hence, although the retaining fingers may be produced with reasonable accuracy of wire-retaining convergence, it has been impossible in a practical sense to maintain such close tolerances, accuracy of mutual retaining conjunction of the prong tips, and sharpness of retaining edges to assure satisfactory retention of fine gauge wires although for heavier gauges no substantial problem may be encountered.

It is to the overcoming of the foregoing and other deficiencies and disadvantages of the prior constructions that the present invention is directed. More particularly, by the present invention effective, highly satisfactory and reliable retention of even the finest gauge wires that have the axial strength to be thrust into engagement within the vertex of the retaining fingers of a solder well terminal. For this purpose the invention provides new and improved wire-retaining prongs in a solder well terminal.

Among other aims and objects of the invention are the provision of novel wire-retaining prongs in electrical terminals in which effective use is made of side edges of the prongs.

Another object of the invention is to provide an electrical terminal having a novel arrangement of plural, successively functioning sets of retaining prongs and fingers.

A further object of the invention is to provide a novel tubular electrical terminal construction having wire-gripping and retaining prongs and fingers of successively increasing yieldable resistance.

Yet another object of the invention is to provide a new and improved tubular electrical terminal construction in which a set of principal retaining fingers has an auxiliary set of retaining fingers struck therefrom.

It is also an object of the invention to provide a novel method of making electrical terminals of the solder well type with successively operable wire-gripping prongs and fingers.

Other objects, features and advantages of the present invention will be readily apparent from the following detailed description of a practical embodiment thereof taken in conjunction with the accompanying drawing, in which.

Figures 1, 2, 3, 4, 5:
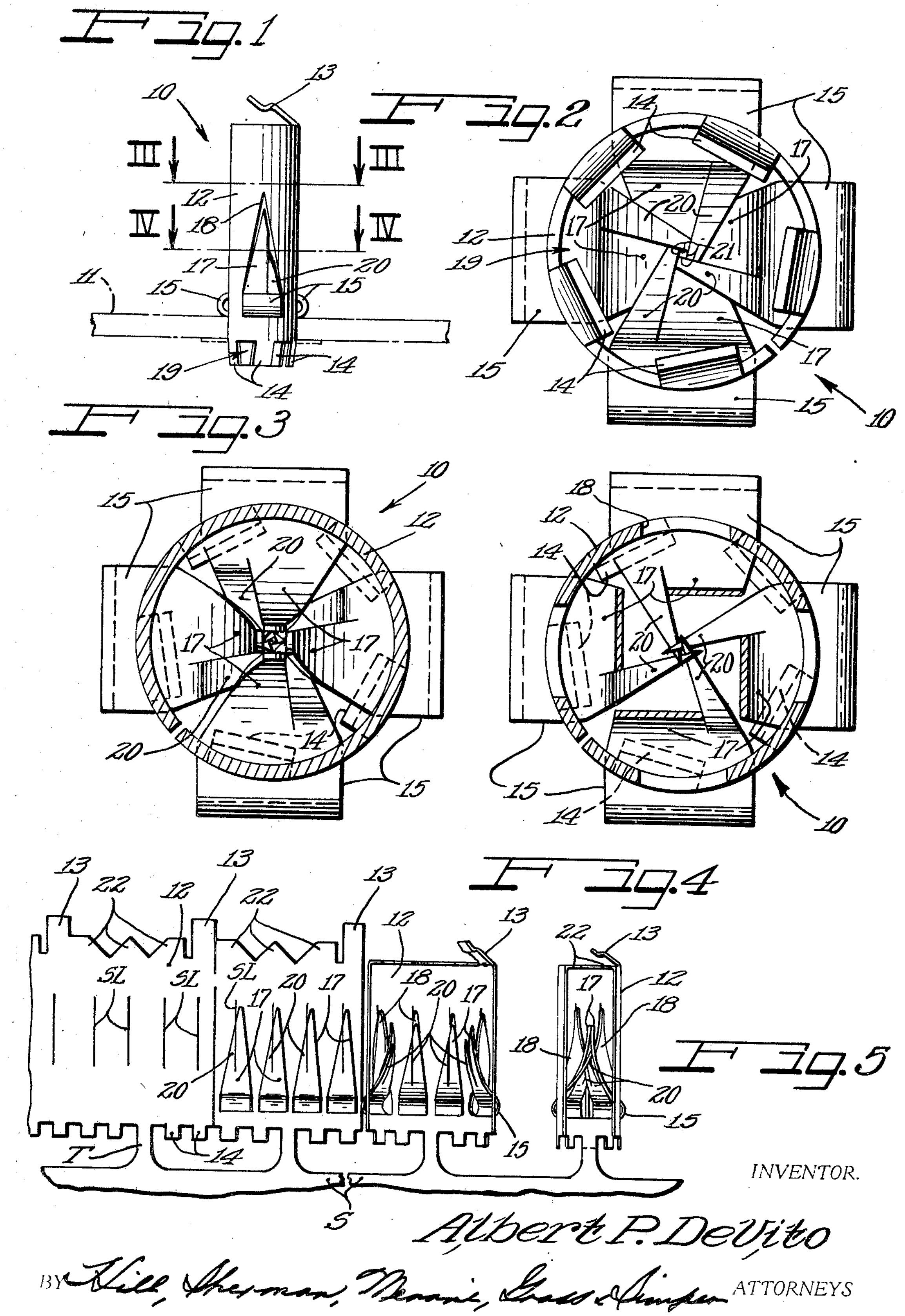
FIG. 1 is a side elevational view of a solder well terminal embodying features of the invention.
FIG. 2 is a substantially enlarged base end view of the terminal.
FIG. 3 is an enlarged transverse sectional and plan detail view taken substantially along the line III—III of FIG. 1.
FIG. 4 is a similar sectional plan detail view taken substantially along the line IV—IV of FIG. 1.
FIG. 5 is a step-by-step fragmental plan view illustrating successive steps in the method of making terminals according to the present invention.

An electrical connector or terminal 10 of the kind referred to as a solder lug or well is constructed and arranged to be mounted on a strip or panel 11 of self-sustaining, rigid or semi-rigid insulating material (FIG. 1), and to receive one or more electrical lead wires to be connected in electrical circuitry. Although the terminal 10 may be made in any desired size, for illustrative purposes, it is shown greatly enlarged from the usual commercial sizes for this type of terminal. For example, a commercial size may be on the order of one fourth the size of the illustration in FIG. 1 and made from .010½ hard brass.

In a preferred form, the terminal 10 comprises a substantially rigid, tubular body 12 of substantial length having on its crown end a solder lug 13. On its base extremity the body 12 has a set of bendable retaining lugs 14 which, after the base end portion of the body is inserted through a suitable aperture in the panel 11 are bent outwardly into clamping engagement with the body opposite outwardly bulging shoulder means 15 suitable spaced from the retaining lug. In a desirable form, the shoulder means 15 comprise respective outwardly bulged base curls of respective retaining fingers 17 of generally elongated triangular form struck from the body 12 and converging inwardly and away from and in overlying relation to a base end opening 19 into the body through which electrical wires are adapted to be inserted into gripped engagement by and between the convergently related cooperating tips of the retaining fingers.

The manner of convergence of the fingers 17 is illustrated on a substantially large scale in FIG. 3 and it will be observed that the tip portions thereof are in generally face-wise contiguity mutually pressing against one another in a manner which places the fingers under at least some resilient tension so that when a wire is thrust from the open end 19 into and through the vertex of the finger tips substantial grip of the wire results, where the wire is of sufficient gauge to cause the fingers to yield resiliently from their initial convergent contiguity. In a four finger set and with the fingers 17 in a quadrant relationship excellent results in retaining substantial gauges of lead wires preliminary to soldering has been experienced. Then, after a dip soldering operation, wherein the openings 18 afford excellent entry of the liquid solder, an efficient soldered connection of the lead wire to the fingers 17 and thereby to the terminal is attained. By "lead wire" is meant either a single wire or a bundle of wires which may be in one lead or may comprise several different leads.

For efficiently handling lead wires of small gauge and which may be of a size which may tend to slip from the grip of the retaining fingers 17 or which may even be such relatively weak axial strength as to be relatively incapable of resisting the force of thrust necessary to pass between the principal retaining fingers 17, a novel set of elongated wire-retaining prongs 20 (FIGS. 1, 2 and 4) is provided so constructed and arranged as to be especially effective in receiving and gripping the smaller gauges of lead wire. In an efficient construction, the prongs 20 are substantially narrower than the fingers 17, are more sharply pointed, are shorter than the fingers, are off-set relative to the axes of the fingers, and are formed as integral side extensions of the fingers through which the prongs are integrally on and attached to the body 12. These prongs 20 are constructed and related to converge over and away from the opening 19, within the generally pyramidal chamber defined by the fingers 17. Wire-gripping tip portions on the prongs 20 are yieldably interdigitated about a wire-receiving vertex spaced from the vertex of the fingers 17. In the interdigitated relationship of the convergent prong tips, they progressively lap or cross over one another about the vertex in substantially the manner illustrated, and resulting from their offset integral extension from the respective similar sides of the fingers 17 and divergent inward relationship to the respective fingers. As a result, the prongs 20 at their interdigitated convergence present respective wire-gripping side edges 21 about the wire-receiving vertex for gripping even the thinnest wire of sufficient strength to be thrust endwise through the prong vertex. Since these edges are fairly sharp and have the usual burrs of stamped sheet metal edges, they have a highly efficient gripping action on the inserted wire and effectively resist withdrawal. In addition, of course, wires of sufficient diameter to resiliently move the prongs 20 apart will be gripped by the sharp points on the gripping tip portions of the prongs.

In an efficient method of making the terminal 10, it is desirably produced by progressive die stamping and forming techniques. Whereas in such dies it is economical to stamp out the terminals progressively by multiples and in greater number of steps, for illustrative purposes four of the progressive steps are shown in FIG. 5. In certain preliminary steps a sheet metal strip S is stamped and trimmed to provide a series of flat terminal body blanks 12, each connected by a narrow trunk T to the strip. On the connecting trunk end of each of the blanks are the bendable base securing lugs 14, while at the opposite end is the solder lug 13 and a set of cooperative shorter lugs 22 which eventually will be bent over to provide a stop crown on the terminal adjacent to the solder lug.

As a preliminary step and before striking out of the retaining fingers 17, each of the body blanks 12 is sheared with a set of equally spaced coextensive longitudinally extending slits SL properly orientated along the length of the blank to provide lines of severance which will result in the prongs 20 coincident with striking out of the fingers 17 across the slits as shown in the second progressive stage of the development of the blank, starting at the left as shown in FIG. 5. This concurrent forming and severance of the prongs 20 with striking out of the fingers 17 results from the positioning of the slits SL in properly off-set parallel relation to the longitudinal axis of each of the respective fingers such that the diagonal line along which one side of the finger is struck out will intersect the associated preformed slit SL. This also results in a virtually needle sharp point on the tip of each of the prongs 20, whereas for practical die stamping technique reasons the points of the tips of the fingers 17 are more blunt because of limitations on stamping die shape, and more particularly the impracticability of maintaining sharp tip edges on high production forming dies.

As the final step in shaping the fingers 17 and the prongs 20, the shoulder bulges 15 are pressed in the base portions of the fingers 17, the fingers 17 are bent to the desired extent diagonally from the body length, and at the same time the prongs 20 are bent into the desired inward divergent relation to the respective fingers from which they extend.

This forming of the fingers 17 and the prongs 20 actually is accomplished as an intermediate step between the second and third steps illustrated in FIG. 5, and illustration has been omitted for brevity and because the result of that forming step is well understood from the third step from the left as illustrated in FIG. 5. During the non-illustrated step or steps, also, the solder lug 13 and the crown lugs 22 are bent into their desired positions relative to the body 12. Thereafter in a series of steps, of which the fourth and fifth stages, from the left, as illustrated in FIG. 5 are contiguous along the strip S, the body blank 12 is progressively shaped into the tubular form by bending the opposite side edges thereof toward one another. In progressive steps thereafter the body tube is completed by bringing the opposite edges together.

As the body 12 is progressively shaped or wrapped around into its tubular form, the fingers 17 are gradually brought into their convergent relation with the tip portions contiguous and pressing against one another, and the prongs 20 enter into the generally overlapping, interdigitated relationship about a vertex which is coaxial with the vertex of the fingers 17 and with the axis of the chamber within the completed body 12. Finally, the completed terminal is severed from its trunk T, a vestigial portion of which comprises one of the securing lugs 14. Thereafter, the completed lugs may be plated, if desired.

It will be understood that modifications and variations may be effected without departing from the scope of the novel concepts of the present invention.

I claim as my invention:

1. An electrical terminal such as of the solder well type, comprising:

a tubular body having an opening into one end receptive of an electrical wire thrust thereinto endwise;

a set of elongated wire-retaining prongs on said body converging over and away from said opening;

and wire-gripping tip portions on said prongs yieldably crossed over one another in interdigitated relation to define a wire-receiving vertex.

2. A terminal according to claim 1, said tip portions having wire-gripping side edges facing toward the axis of the vertex.

3. A terminal according to claim 1, comprising retaining fingers of generally triangular form carried by said body and converging away from said opening to a vertex spaced beyond the vertex defined by said prong tip portions, said prongs being side extensions of said fingers.

4. A terminal according to claim 3, in which said tip portions of the prongs have substantially needle-sharp points.

5. A terminal according to claim 3, in which said fingers and prongs are struck from the tubular body and the areas from which each of the fingers and their prong are struck providing substantial solder-entrance openings into the tubular body.

6. A terminal according to claim 1, having convergently related wire-retaining fingers of larger size than said prongs extending in the same direction and therebeyond, and said prongs being located along the sides of said fingers and off-set from the longitudinal axes of the fingers to the same respective sides of the fingers.

7. A terminal according to claim 6, in which there are four of the fingers and four of the prongs.

8. An electrical terminal of the character described, comprising:

a tubular sheet metal body with an opening at one end through which an electrical wire is adapted to be inserted;

a plurality of retaining fingers having base end portions integral with said body and convergently related with tip end portions thereof providing a wire-receiving vertex spaced from said opening;

and respective retaining prongs along the side of said fingers convergently related and having tip end portions crossed over and interdigitated to provide a wire-receiving vertex between and spaced from said opening and said finger tip end portion vertex.

9. An electrical terminal of the character described comprising:

a stamped sheet metal body;

longitudinal spaced parallel coextensive slits intermediate the length of said body;

and retaining fingers on said body and having edges intersecting said slits and with smaller retaining prongs as extensions along the sides of the fingers and separated along the sides of the prongs from the respective fingers by said slits.

10. A terminal according to claim 9, said fingers extending diagonally from a face of the body and said prongs extending diagonally from the respective fingers.

11. A terminal according to claim 10, in which said body is of tubular form, said fingers converging and defining a wire-receiving vertex, and said prongs being in yieldably interdigitated relation crossing over one another about a wire-receiving vertex coaxial with and spaced from said finger vertex.

12. An electrical terminal of the character described comprising a tubular sheet metal body with an opening at one end through which an electrical wire is adapted to be inserted; a plurality of retaining fingers having base end portions integral with said body and convergently related with top end portions thereof providing a wire-receiving vertex spaced from said opening; respective prongs along the sides of said finger convergently related and having tip end portions providing a wire-receiving vertex between and spaced from said opening and said finger tip end portion vertex; said prongs being common to said fingers and separated along one side from the associated fingers by a respective slit extending from said tip end portions partially along the length of the fingers to adjacent the base end portions thereof and substantially short of the body.

References Cited

UNITED STATES PATENTS

| | | | |
|---|---|---|---|
| 3,060,402 | 20/1962 | Olsson et al. | 339—242 |
| 3,348,192 | 10/1967 | De Vito | 339—258 |

FOREIGN PATENTS

| | | |
|---|---|---|
| 755,651 | 8/1956 | Great Britain. |

RICHARD E. MOORE, Primary Examiner

J. H. McGLYNN Assistant Examiner

U.S. Cl. X.R.

339—275